(12) United States Patent
Cormode et al.

(10) Patent No.: US 8,631,500 B2
(45) Date of Patent: Jan. 14, 2014

(54) GENERATING MINIMALITY-ATTACK-RESISTANT DATA

(75) Inventors: Graham Cormode, Morristown, NJ (US); Tiancheng Li, West LaFayette, IN (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 753 days.

(21) Appl. No.: 12/825,466

(22) Filed: Jun. 29, 2010

(65) Prior Publication Data

US 2011/0321169 A1 Dec. 29, 2011

(51) Int. Cl.
*G06F 21/00* (2013.01)

(52) U.S. Cl.
USPC ............. 726/26; 707/688; 707/737; 707/752; 707/757

(58) Field of Classification Search
None
See application file for complete search history.

(56) References Cited

U.S. PATENT DOCUMENTS

| | | | | |
|---|---|---|---|---|
| 8,284,939 | B2 * | 10/2012 | Tahan et al. | 380/270 |
| 2002/0169793 | A1 * | 11/2002 | Sweeney | 707/204 |
| 2008/0209568 | A1 * | 8/2008 | Chang et al. | 726/26 |
| 2009/0254971 | A1 * | 10/2009 | Herz et al. | 726/1 |
| 2010/0024042 | A1 * | 1/2010 | Motahari et al. | 726/26 |
| 2010/0114840 | A1 * | 5/2010 | Srivastava et al. | 707/688 |
| 2010/0114920 | A1 * | 5/2010 | Srivastava et al. | 707/757 |
| 2011/0131222 | A1 * | 6/2011 | DiCrescenzo | 707/757 |

* cited by examiner

*Primary Examiner* — Hadi Armouche
(74) *Attorney, Agent, or Firm* — Hartman & Citrin LLC

(57) ABSTRACT

The present disclosure is directed to systems, methods, and computer-readable storage media for generating data and data sets that are resistant to minimality attacks. Data sets having a number of tuples are received, and the tuples are ordered according to an aspect of the tuples. The tuples can be split into groups of tuples, and each of the groups may be analyzed to determine if the group complies with a privacy requirement. Groups that satisfy the privacy requirement may be output as new data sets that are resistant to minimality attacks.

16 Claims, 6 Drawing Sheets

GENERATING MINIMALITY-ATTACK-RESISTANT DATA

BACKGROUND

This application relates generally to anonymization of data and data sets. More specifically, the disclosure provided herein relates to generating data and data sets that are resistant to minimality attacks.

Anonymization of data has become a popular method of protecting the privacy of individuals, accounts, or other private information associated with shared data. For example, an entity sharing data that includes sensitive information may anonymize the data to allow others to study the data without compromising privacy of individuals or entities reflected in the data. Thus, third parties can apply new analysis and data mining techniques to the data without exposing individuals or entities associated with the data.

Similarly, entities in control of sensitive data may wish to retain and/or use data that includes sensitive information. Various laws and regulations affect how such data may be retained and/or used over time. Additionally, attackers may target stored sensitive data in an attempt to obtain personal information of entities or persons associated with the sensitive data. Thus, the entities in control of the data may wish to anonymize the data to protect individuals and/or entities associated with sensitive information from exposure.

One problem with anonymizing data is that important aspects of the data may be lost, thereby affecting the usefulness of the anonymized data compared to the original data. In response to these considerations, many methods and definitions have been introduced for minimizing the amount of information lost during anonymization of shared data. Efforts to minimize the amount of data by anonymization, however, can expose private information to determination via inference and knowledge of anonymization techniques, sometimes referred to as "minimality attacks." Minimality attacks are possible for a variety of privacy algorithms and definitions.

SUMMARY

The present disclosure is directed to generating data and data sets that are resistant to minimality attacks. Data sets having a number of tuples are received, and the tuples are ordered according to an aspect of the tuples. The tuples can be split into groups of tuples, and each of the groups may be analyzed to determine if the group complies with a privacy requirement. In some embodiments, the anonymization engine orders tuples in data sets into buckets. Each bucket includes a predefined number of tuples.

A bucket is selected as a group, and the group is analyzed to determine if the group complies with the privacy requirement. Additional buckets can be added to the group until the group complies with the desired privacy requirement. Privacy-requirement-compliant groups are generated until there are no additional buckets available. Groups that are not compliant with the desired privacy requirements can be removed from the data set, and output corresponding to one or more new data sets can be generated. The output can include the privacy-requirement-compliant groups, output collectively as a data set and/or individually as data sets.

In other embodiments, data sets having a number of tuples are received, and the tuples are ordered according to an aspect of the tuples. The data sets are split into a number of groups. The groups can be even or uneven portions of the data set. For example, the groups can be even halves of the data set, and/or uneven halves of the data set if the data set includes an odd number of tuples. The groups also can include thirds, quarters, fifths, and the like of the data set. The groups are analyzed to determine if the groups comply with a desired privacy requirement or anonymization approach. If so, the groups are recursively split and analyzed until the groups can no longer be split without losing the desired privacy or anonymization characteristics. Non-compliant groups can be merged back together and output. Compliant groups also can be output.

According to an aspect, a computer-implemented method for generating data that is resistant to minimality attacks includes receiving a data set at an anonymization engine. The data set includes a number of tuples. The tuples are ordered according to an aspect of the tuples, and a number of groups of tuples are generated, wherein each group satisfies a privacy requirement. In some embodiments, the method further includes partitioning the tuples into buckets. The buckets include a predefined number of tuples. The method further can include selecting a bucket as a group, determining if the group satisfies a privacy requirement, and taking an action based upon the determining. In some embodiments, the privacy requirement includes l-diversity, and the predefined number of tuples includes l.

According to various embodiments, taking the action includes determining if additional buckets are available, in response to determining that the group does satisfy the privacy requirement, and outputting a new data set including the group, in response to determining that the additional buckets are not available. Taking the action also may include determining if additional buckets are available, in response to determining that the group does not satisfy the privacy requirement, and outputting the data set, in response to determining that the additional buckets are not available.

Additionally, the method may include merging an additional bucket into the group to obtain a new group, in response to determining that the additional buckets are available, determining if the new group satisfies the privacy requirement, determining if additional buckets are available, in response to determining that the group does satisfy the privacy requirement, and outputting a new data set including the group, in response to determining that the additional buckets are not available.

According to various embodiments, the method further includes removing a group that does not satisfy the privacy requirement before outputting the new data set. Taking the action also can include determining if additional buckets are available, in response to determining that the group does satisfy the privacy requirement, selecting a new group, in response to determining that the additional buckets are available, determining if the new group satisfies the privacy requirement, and taking an action based upon the determining.

According to additional embodiments, the method for generating the groups includes splitting the data set into a number of groups, determining if a selected group satisfies a privacy requirement, and taking an action based upon the determining. If the selected group does not satisfy the privacy requirement, the method can include merging the number of groups together to obtain the data set and outputting the data set. The method further can include selecting a one of the number of groups, determining if the one of the number of groups satisfies the privacy requirement, and splitting the one of the number of groups, in response to determining that the one of the number of groups does satisfy the privacy requirement. According to various embodiments, the tuples include sensitive data and non-sensitive data, and wherein the aspect of the tuples includes the non-sensitive data. The data set also can include data collected from a telecommunications network.

According to another aspect, a system for generating data that is resistant to minimality attacks includes a processor for executing computer-executable instructions stored in a memory. Execution of the computer-executable instructions cause the system to receive a data set including a number of tuples, each of the tuples including sensitive data and non-sensitive data, order the tuples in the data set according to the non-sensitive data, and generate a number of groups of the tuples, wherein each group satisfies a privacy requirement.

According to some embodiments of the system, execution of the computer-executable instructions cause the system to partition the tuples into a number of buckets, each of the number of buckets including a predefined number of tuples, select a one of the number of buckets as a group, determine if the group satisfies a privacy requirement, and take an action based upon the determining. According to other embodiments of the system, execution of the computer-executable instructions cause the system to split the data set into a number of groups, determine if a selected group satisfies a privacy requirement, and take an action based upon the determining.

According to another aspect, a computer-readable storage medium includes computer-executable instructions, executable by an anonymization engine to provide a method for generating data resistant to minimality attacks. The method can include receiving a data set at an anonymization engine, the data set including a number of tuples including sensitive data and non-sensitive data, ordering the tuples in the data set according to the non-sensitive data, and generating a number of groups of the tuples, wherein each group satisfies a privacy requirement.

According to some embodiments of the computer-readable storage medium, the method further includes partitioning the tuples into a number of buckets, each of the number of buckets including a predefined number of tuples, selecting a one of the number of buckets as a group, and determining if the group satisfies a privacy requirement. In response to determining that the group does satisfy the privacy requirement, the method can include determining if additional buckets are available and outputting a new data set including the group, in response to determining that the additional buckets are not available. In response to determining that the group does not satisfy the privacy requirement, the method can include outputting the data set.

According to other embodiments of the computer-readable storage medium, the method further includes splitting the data set into a number of groups, selecting a one of the number of groups, and determining the one of the number of groups satisfies a privacy requirement. In response to determining that the one of the number of groups does not satisfy the privacy requirement, the method can include merging the number of groups together to obtain the data set and outputting the data set. In response to determining that the one of the number of groups does satisfy the privacy requirement, the method can include recursively splitting the one of the number of groups into a second plurality of groups, and determining if the second plurality of groups satisfies the privacy requirement.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for generating data and data sets that are resistant to minimality attacks. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
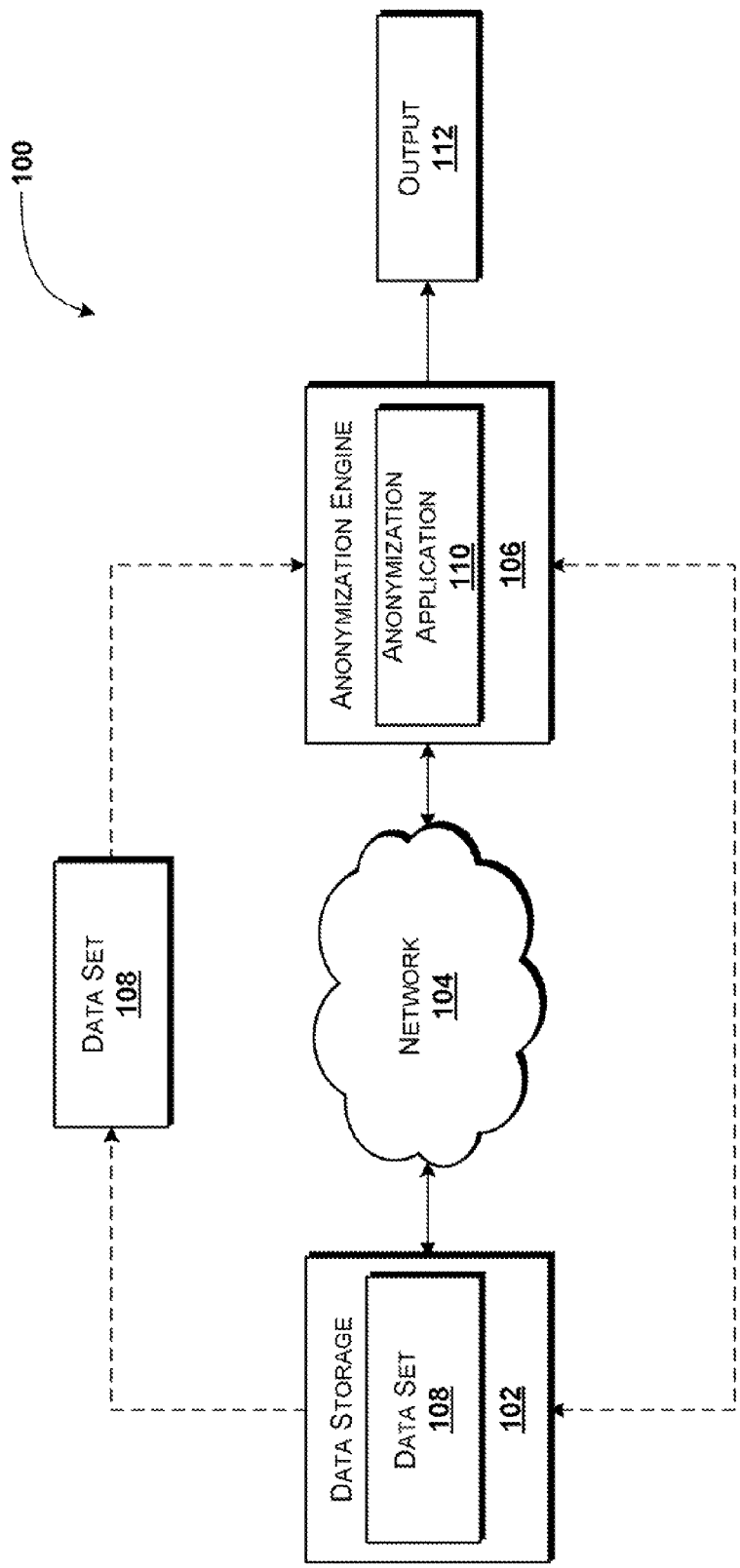
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a data storage device 102. According to various embodiments, the functionality of the data storage device 102 described herein may be provided by one or more data storage locations, server computers, computer readable media (as defined herein), desktop computers, mobile telephones, laptop computers, other computing systems, and the like. The data storage device 102 can be configured to operate on or in communication with a network 104. An exemplary network 104 is described in more detail below with reference to FIG. 5. The data storage device 102 also can be configured to communicate with an anonymization engine 106 via the network 104 and/or via a direct link.

As illustrated in FIG. 1, the data storage device 102 stores or hosts one or more data sets 108. The data sets 108 can include data stored in almost any format. In the described embodiments, the data sets 108 are described as being stored in a database or data table. The data sets 108 can include almost any number of data entries ("tuples"). It should be understood that this embodiment is exemplary, and should not be construed as being limiting in any way.

In some embodiments, the data sets 108 include moderate to large data sets 108, ranging from about one thousand tuples to tens, scores, or hundreds of thousands of tuples, or more. In other embodiments, the data sets 108 include less than one thousand tuples, and in still other embodiments, the data sets 108 include millions of tuples. Regardless of the size of the data sets 108, the data sets 108 can include tuples that include various types of data. The data includes, in some embodiments, at least one sensitive attribute.

A sensitive attribute, as used herein, refers to some information or data relating to an entity that invokes privacy concerns. Exemplary sensitive attributes include, but are not limited to, healthcare data, income, mental health records, other sensitive information, and the like. The sensitive attributes can be included in tuples of the data set 108, and may correlate to a particular person or entity on the basis of being respective parts or components of a tuple in the data set 108. For privacy reasons, one storing or sharing the data set 108, for example for analysis or other purposes, generally attempts to sever a link between the sensitive attribute and information that may be used to positively identify a person or entity associated with the sensitive attribute, referred to herein as quasi-identifiers. There are various methods of severing this link, also referred to as anonymization. These methods include, but are not limited to, generalization and suppression, permutation, and the like.

One method of guaranteeing privacy is the l-diversity approach. In l-diversity, no distinct sensitive attribute value, e.g., presence or absence of a disease, is repeated more than 1/l fraction of the time in any group of tuples. In some instances, only certain values of the sensitive attribute are deemed sensitive, and thus only these particular values must obey the 1/l fraction to satisfy l-diversity. This is referred to as simple l-diversity. A variation of l-diversity is binary l-diversity, wherein the sensitive attribute encodes positive or negative values, and each group should have at most 1/l fraction of positive or negative values, depending upon which value is sensitive. The non-sensitive value for the sensitive attribute need not comply with the 1/l limit. Other attempts at guaranteeing privacy include, but are not limited to, k-anonymization, t-closeness, Mondrian, anatomy, and other approaches. These methods are not described herein in detail for the sake of brevity.

The quasi-identifiers can be used to identify a person explicitly or implicitly, i.e., by way of inference. The quasi-identifiers can include, but are not limited to, gender, date of birth, height, postal code, telephone area code, and the like. Individually, the quasi-identifiers generally may be insufficient for an attacker to positively associate sensitive attributes with a particular person or entity. If enough quasi-identifiers are included in the data set 108, however, some rows of the data set 108, i.e., some tuples, may be unique, thereby enabling an attacker to positively identify one or more persons or entities associated with sensitive data in the data set 108. Thus, the quasi-identifiers, when taken with the sensitive attribute data that also can be stored in a row of the data set 108, may be used to associate sensitive attribute data with a unique person or entity using various methods of inference, also known as a minimality attack.

A minimality attack is an attack in which an attacker assumes a known anonymization approach, and therefore assumes a known anonymization algorithm and/or parameters used to anonymize data in the data set 108. The data set 108 implicitly encodes a number of possible permutations of original input anonymized to obtain the data set 108. In a minimality attack, an attacker analyzes these permutations, and determines some of the permutations to be infeasible, based upon the application of the known anonymization algorithms and/or parameters. By ruling out some possible permutations of the original input, and by the process of elimination and additional analysis, the attacker is able to identify some or all of the original input. Even if the attacker does not positively decode the original input in its entirety, the identified data can violate privacy requirements. For example, a simple l-diversity requirement assumes that an attacker cannot positively identify an individual or entity associated with a sensitive attribute, and assigns a confidence of 1/l to this assumption. In a minimality attack, however, this confidence level can become larger than 1/l.

The operating environment 100 includes an anonymization engine 106 operating on or in communication with the network 104. The anonymization engine 106 is configured to provide the functionality described herein for generating data or data sets 108 that are resistant to minimality attacks. The anonymization engine 106 is configured to execute an operating system (not illustrated) and one or more application programs such as, for example, an anonymization application 110, and/or other application programs.

The operating system is a computer program for controlling the operation of the anonymization engine 106. The application programs are executable programs configured to execute on top of the operating system to provide the functionality described herein. The anonymization application 110 is configured to receive the data sets 108, to order the tuples in the data sets 108, to separate the tuples in the data sets 108 into groups that comply with a desired privacy requirements or anonymization approach, and to generate output 112 that includes the groups of tuples that are resistant to minimality attacks. As will be explained in more detail below, the output 112 also can include the quasi-identifiers and sensitive attributes for the tuples in the data set 108. The quasi-identifiers and sensitive attributes can be published separately from the data set 108, if desired.

In some embodiments, the anonymization engine 106 orders tuples in the data sets 108 into buckets. The buckets are small collections of tuples, typically a predefined number of tuples. The buckets may have ten tuples, twenty tuples, or any other number of tuples, depending upon preferences, settings, and/or other considerations. A bucket is selected as a group and is analyzed to determine if the group complies with the required privacy requirements. Additional buckets are added to the group until the group complies with the desired privacy requirements. Privacy-requirement-compliant groups are generated until there are no additional buckets available. Groups that are not compliant with the desired privacy requirements are dropped, and the anonymization engine 106 can generate the output 112 corresponding to one or more groups of tuples that are compliant with the desired privacy requirements. The output 112 can include the privacy-requirement-compliant groups, output collectively as a group of tuples, or output as multiple groups of tuples. As mentioned above, the output 112 also can include quasi-identifiers and sensitive attributes relating to the tuples in the groups.

In other embodiments, the anonymization engine 106 obtains one of the data sets 108, and splits the data set into groups. The groups can be even or uneven portions of the data set 108. For example, the groups can be even halves of the data set 108, and/or uneven halves of the data set 108 if the data set 108 includes an odd number of tuples. The groups also can include thirds, quarters, fifths, and the like of the data set 108, as will be explained in more detail below with reference to FIG. 4. The groups are analyzed to determine if the groups comply with a desired privacy requirement or anonymization approach. If so, the groups are recursively split and analyzed until the groups can no longer be split without losing the desired privacy or anonymization characteristics. Non-compliant groups can be merged back together and output as the output 112 described above. Compliant groups also can be output as the output 112. These and other features of the anonymization engine 106 are described in more detail below with reference to FIGS. 2-6.

FIG. 1 illustrates one data storage device 102, one network 104, and one anonymization engine 106. It should be understood, however, that some implementations of the operating environment 100 include multiple data storage devices 102, multiple networks 104, and multiple anonymization engines 106. Therefore, the illustrated embodiment should be understood as being exemplary, and should not be construed as being limiting in any way.

Figure 2:
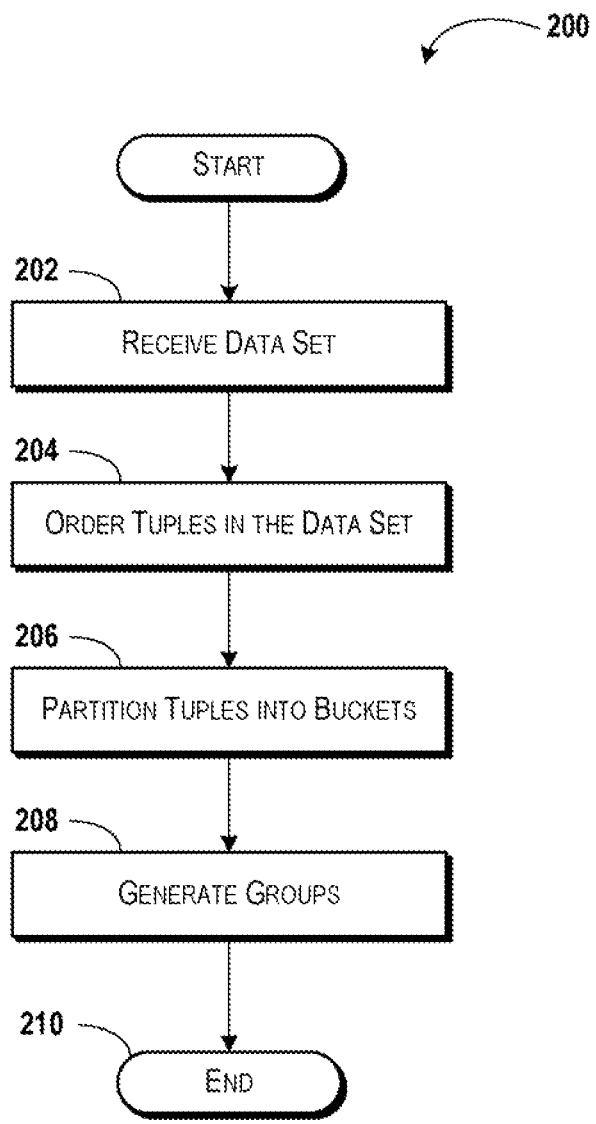
FIG. 2 is a flow diagram showing aspects of a method for generating anonymized data groups that are resistant to minimality attacks, according to an exemplary embodiment.

Turning now to FIG. 2, aspects of a method 200 for generating anonymized data groups that are resistant to minimality attacks will be described in detail. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method can be ended at any time and need not be performed in its entirety. Some or all operations of the method, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the anonymization engine 106. It should be understood that these embodiments are exemplary, and should not be viewed as being limiting in any way. The method 200 begins at operation 202, wherein the anonymization engine 106 receives one of the data sets 108. As explained above, the data set 108 can be received from a data storage device, such as the data storage device 102, in communication with the anonymization engine 106.

From operation 202, the method 200 proceeds to operation 204, wherein the anonymization engine 106 orders tuples in the data set 108. The anonymization engine 106 can order the tuples in the data set 108 according to almost any desired criteria. Generally speaking, as mentioned above, the tuples in the data set 108 can include data corresponding to sensitive attributes and quasi-identifiers. The anonymization engine 106 often does not organize the tuples according to sensitive attribute data, as such an approach may result in data that is susceptible to homogeneity attacks. Furthermore, grouping tuples organized according to the sensitive attribute data may make satisfying diversity requirements, which at best would lead to larger groups of tuples. Thus, ordering the tuples according to the sensitive attributes may defeat the intended purpose of anonymizing the data set 108, though this is not necessarily the case.

In some embodiments, the anonymization engine 106 orders the tuples in the data set 108 according to the quasi-identifiers, such as gender, age, ZIP code, city, state, and the like. It should be appreciated that after ordering the tuples, the data set 108 may include a number of tuples that have similar quasi-identifiers and preferably varied sensitive attribute data.

From operation 204, the method 200 proceeds to operation 206, wherein the anonymization engine 106 partitions the ordered tuples into "buckets" of tuples. For purposes of this specification and the appended claims, a "bucket" can be a fixed-size-collection of tuples. The size of the buckets can be chosen based upon almost any desired criteria. Generally speaking, however, a small size bucket is generally chosen, as small groups of tuples may be desirable. It should be understood that larger buckets and/or groups of tuples may be chosen, depending upon needs and/or requirements. Thus, the choice of small buckets and groups is exemplary, and should not be construed as being limiting in any way.

From operation 206, the method 200 proceeds to operation 208, wherein the anonymization engine 106 generates groups of tuples. Each group will have some number of buckets. In some embodiments, a desired anonymization approach or privacy requirements dictate that one bucket is too few tuples to be output as a group, as the single bucket may not satisfy a requirement such as l-diversity. Thus, the anonymization engine 106 may combine a number of buckets to obtain the groups. The size of the groups can be determined based upon almost any criteria including, but not limited to, the desired anonymization approach or privacy requirement, the desired size of the groups, storage and/or transmission characteristics or capabilities, and the like. The anonymization engine 106 attempts to generate groups that comport with a desired anonymization and/or privacy scheme. Exemplary methods for generating groups that comply with l-diversity or other diversity schemes or approaches, are described in additional detail below with reference to FIGS. 3 and 4. The method ends at operation 210.

Figure 3:
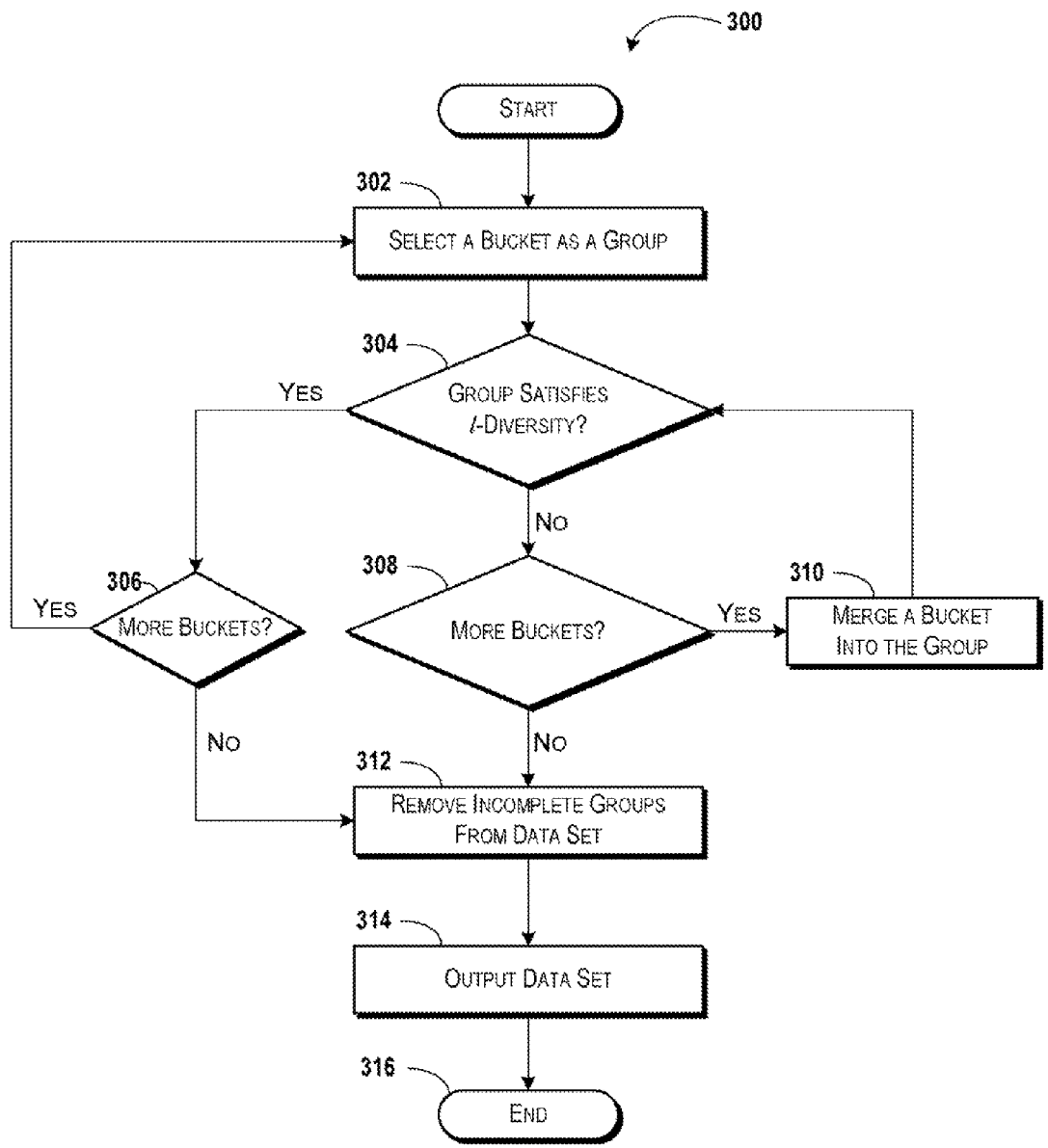
FIG. 3 is a flow diagram showing aspects of a method for generating groups, according to an exemplary embodiment.

Turning now to FIG. 3, a method 300 for generating groups is illustrated, according to an exemplary embodiment. The method 300 begins with operation 302, wherein the anonymization engine 106 selects one of the buckets generated in operation 206 of FIG. 2 as a group. The anonymization engine 106 can select any of the buckets. For purposes of illustrating the concepts and technologies disclosed herein, it is assumed that the anonymization engine 106 selects a first bucket as the first group. It should be understood that this embodiment is exemplary, and should not be construed as being limiting in any way.

From operation 302, the method 300 proceeds to operation 304, wherein the anonymization engine 106 determines if the group being analyzed meets a defined diversity standard. In some embodiments, including the illustrated embodiment, the anonymization engine 106 enforces l-diversity to each of the groups, though other anonymization standards and/or techniques are possible and contemplated. The illustrated embodiment, wherein l-diversity is applied to each group, is exemplary and should not be construed as being limiting in any way. If the group satisfies l-diversity, the method 300 proceeds to operation 306, wherein the anonymization engine 106 determines if additional buckets associated with the data set 108 remain. If additional buckets remain, the method 300 returns to operation 302, and the anonymization engine 106 selects another bucket for analysis.

In operation 304, if the anonymization engine 106 determines that the analyzed group does satisfy l-diversity standard, the method 300 proceeds to operation 308, wherein the anonymization engine 106 determines if additional buckets are available. As explained above with reference to operation 206, the anonymization engine 106 may create a number of buckets, and one or more may be available. If additional buckets are available, the method 300 proceeds to operation 310, wherein the anonymization engine 106 merges another bucket into the group being analyzed.

In some embodiments, the anonymization engine 106 selects the next bucket available in operation 310. Because the tuples are ordered and then partitioned into the buckets, two adjacent or subsequent buckets may have related or similar data. Thus, the next bucket may be a logical extension of the bucket or buckets being analyzed by the anonymization engine 106. After selecting a bucket, the anonymization engine 106 merges the selected bucket into the group being analyzed, and the method 300 returns to operation 304, wherein the anonymization engine 106 again determines if the group satisfies l-diversity standard.

The anonymization engine 106 recursively applies the operations 304, 308, and 310 until the group being analyzed satisfies l-diversity standard, or until there are no more buckets available to add to the group being analyzed when the method 300 reaches an iteration of operation 308. If the anonymization engine 106 determines in operation 308 or in operation 306 that there are no additional buckets available, the method 300 proceeds to operation 312.

In operation 312, the anonymization engine 106 removes any incomplete groups from the data set 108. For purposes of this specification and the appended claims, an "incomplete group" is a group of tuples that does not meet the l-diversity standard, and to which no buckets can be added. These incomplete groups do not comply with privacy requirements, and therefore may be removed from the data set 108 to help reduce the risk of a minimality attack.

From operation 312, the method 300 proceeds to operation 314, wherein the anonymization engine 106 outputs a new data set 108 including the now-diverse groups of tuples. The output 112 generated in operation 314 also can include a set of data corresponding to the quasi-identifiers and sensitive attributes of the tuples in the new data set 108. The quasi-identifiers and sensitive attributes can be separately published, if desired. The groups may be of various sizes, due to the number of buckets merged together to obtain groups that comply with the applied diversity standard, e.g., the l-diversity standard. These groups can be output individually as new data sets 108, or output collectively as the new data set 108. The method 300 ends at operation 316.

In some embodiments, the anonymization engine 106 performs some or all operations of the methods 200 and 300 by applying an algorithm to the data sets 108. The anonymization engine 106 first receives the data set 108. For purposes of illustrating the concepts and technologies disclosed herein, it is assumed that the data set 108, i.e., the input, is a microdata table T including a number of tuples, and a parameter l. The anonymization engine 106 orders the tuples of the table T according to similar quasi-identifiers in the tuples, as discussed above with reference to operation 204 of FIG. 2.

If the anonymization engine 106 uses an l-diversity requirement for the groups, each group must have a size of at least l, as is generally known. Thus, in accordance with step 206 of FIG. 2, the anonymization engine 106 partitions the tuples of the table T into n buckets $\{b_1, b_2, \ldots, b_n\}$ of tuples, each of the buckets $\{b_1, b_2, \ldots, b_n\}$ having a size 1. Because the tuples were ordered according to quasi-identifiers, the utility of the data in the buckets $\{b_1, b_2, \ldots, b_n\}$ generally is preserved as similar tuples are grouped together in the buckets $\{b_1, b_2, \ldots, b_n\}$.

The anonymization engine 106 iteratively generates the groups $\{G_1, G_2, \ldots, G_p\}$, in accordance with the method 300 of FIG. 3. In particular, the anonymization engine 106 defines a first group $G_i$ and begins by putting a first bucket $b_i$ into the group $G_i$. The anonymization engine 106 merges the bucket $b_i$ with a next bucket $b_{(i+1)}$ until the group $G_i$ satisfies l-diversity. The output 112 generated by the anonymization engine 106 in the method 300 is a set of groups $\{G_1, G_2, \ldots, G_p\}$ such that $\{G_1, G_2, \ldots, G_p\}$ are partitions of T and each group $G_i$ ($1 \leq i \leq p$) satisfies l-diversity. If a last group Gp does not satisfy l-diversity, the last group Gp may be removed from consideration for simplicity.

Figure 4:
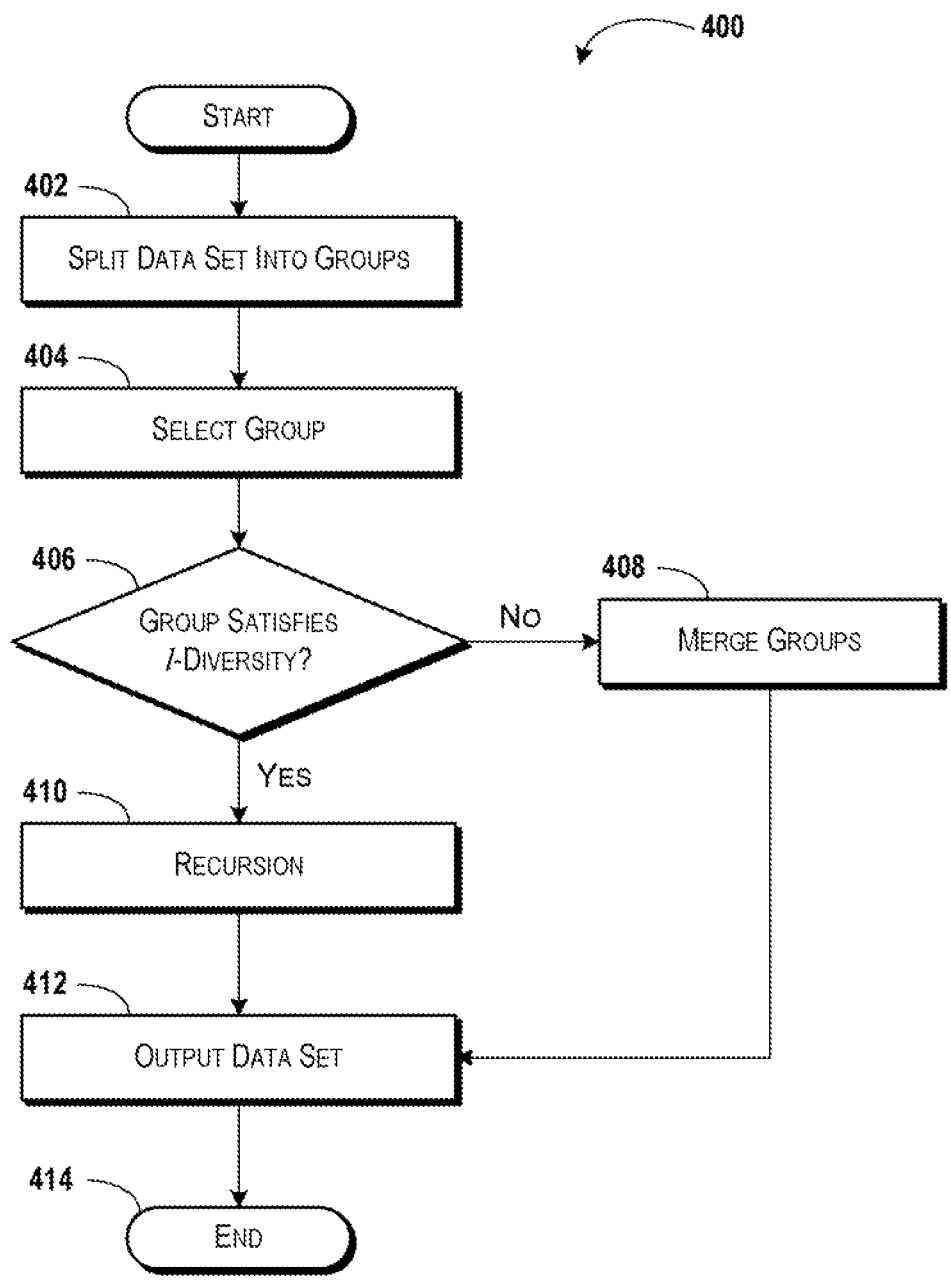
FIG. 4 is a flow diagram showing aspects of a method for generating groups, according to another exemplary embodiment.

Turning now to FIG. 4, a method 400 for generating groups is illustrated, according to another exemplary embodiment. The method 400 begins with operation 402, wherein the anonymization engine 106 splits a received data set 108. The anonymization engine 106 can split the data set 108 into two substantially even groups, but this is not necessarily the case. For example, if the data set 108 contains an odd number of tuples, the anonymization engine 106 can split the data set 108 into two or more uneven groups, wherein one group may include one tuple more or less than the other group.

Thus, it should be understood that the anonymization engine 106 can split the data set 108 into any number of groups having any number of tuples. For example, if the data set 108 contains nine hundred ninety nine tuples, the anonymization engine can split the data set 108 into two groups, wherein one group has four hundred ninety nine tuples and one group has five hundred tuples. Alternatively, the anonymization engine 106 can split the data set 108 into three even groups having three hundred thirty three tuples each, into four groups, wherein three groups have two hundred fifty tuples each and one group has two hundred forty nine tuples, as well as other combinations. For purposes of describing the concepts and technologies disclosed herein, the method 400 is described with reference to the embodiment wherein the anonymization engine 106 attempts to split the data set 108 into even groups. It should be understood that this embodiment is exemplary, and should not be construed as being limiting in any way.

From operation 402, the method 400 proceeds to operation 404, wherein the anonymization engine 106 selects one of the groups for analysis. From operation 404, the method 400 proceeds to operation 406, wherein the anonymization engine 106 determines if the group being analyzed meets a defined diversity standard. In some embodiments, the l-diversity standard is applied to each of the groups, though other anonymization standards and/or techniques are possible and contemplated. The illustrated embodiment, wherein the l-diversity is applied to each group, is exemplary and should not be construed as being limiting in any way. If the anonymization engine 106 determines that the group does not satisfy l-diversity, the method 400 proceeds to operation 408, wherein the anonymization engine 106 merges the groups generated in operation 402 back into one group. If the anonymization engine 106 determines that the group does satisfy l-diversity, the method 400 proceeds to operation 410, wherein the anonymization engine 106 recursively applies operations 404-408, or operations 402-408.

More particularly, the anonymization engine 106 applies operations 404-408 if another group generated in operation 402 remains. In other words, if the anonymization engine 106 analyzed a first group of two or more groups generated in operation 402, the anonymization engine 106 can analyze a second or subsequent group by applying operations 404-408 as described above. If all groups have been analyzed, the anonymization engine 106 can recursively apply operations 402-408 to the analyzed groups. Thus, the anonymization engine 106 now can split the analyzed groups into new groups, or subgroups, analyze the new groups or subgroups in turn, and determine if the new groups or subgroups comply with the required privacy requirement or anonymization approach. These steps can recursively be applied until groups can no longer be split without losing the required diversity level.

From operation 410, the method 400 proceeds to operation 412, wherein the anonymization engine 106 outputs the new data set 108. The anonymization engine 106 can output each group as a new data set, or can output all of the groups collectively as a new data set 108. The method 400 ends at operation 414.

In some embodiments, the anonymization engine 106 performs some or all operations of the method 400 by applying an algorithm to the data sets 108. The anonymization engine 106 first receives the data set 108. For purposes of illustrating the concepts and technologies disclosed herein, it is assumed that the data set 108, i.e., the input, is a microdata table T including a number of tuples, and a parameter l. The anonymization engine 106 orders the tuples of the table T according to similar quasi-identifiers in the tuples, as discussed above.

The anonymization engine 106 begins by assuming that first group $G_1$ is the entire data set 106, i.e., the table T. As described above with operation 402, the anonymization engine 106 splits the group $G_1$, i.e., the table T, into groups G' and G''. As explained above with reference to operations 404-410, the anonymization engine 106 determines if the groups G', G'' satisfy l-diversity. If both groups G', G'' satisfy l-diversity, the anonymization engine 106 recursively splits the groups G', G'' in turn until l-diversity may no longer be maintained after splitting a group. The output 112 generated by the anonymization engine 106 in the method 400 is a set of groups $\{G_1, G_2, \ldots, G_p\}$ such that $\{G_1, G_2, \ldots, G_p\}$ are partitions of T and each group $G_i$ ($1 \le i \le p$) satisfies l-diversity.

The algorithm, in general terms, applies the following steps. The anonymization engine 106 initializes the algorithm with a current group G=T, wherein T is a table with r tuples. The anonymization engine 106 then splits the current group G of r tuples into a number of groups. Assuming two groups for the purposes of illustration, the anonymization engine 106 splits G=$t_1 \ldots t_r$, into G'=$t_1 \ldots t_{(l+r)/2}$ and G''=$t_{((l+r)/2+1)} \ldots t_r$. If both groups G' and G'' satisfy l-diversity, the anonymization engine 106 recursively splits each of the groups G' and G''. The above algorithm is an exemplary embodiment of the operations of the method 400, and should not be construed as being limiting in any way.

In some embodiments, the anonymization engine 106 is used to anonymize network data associated with the network 104. Various devices and software can collect performance and other data associated with the network 104. In some embodiments, the data associated with the network 104 may include sensitive attributes that an entity using, storing, or sharing the data wishes to anonymize. The network 104 therefore can include a telecommunications network, or a combination of telecommunications network, as described below with reference to FIG. 5.

Figure 5:
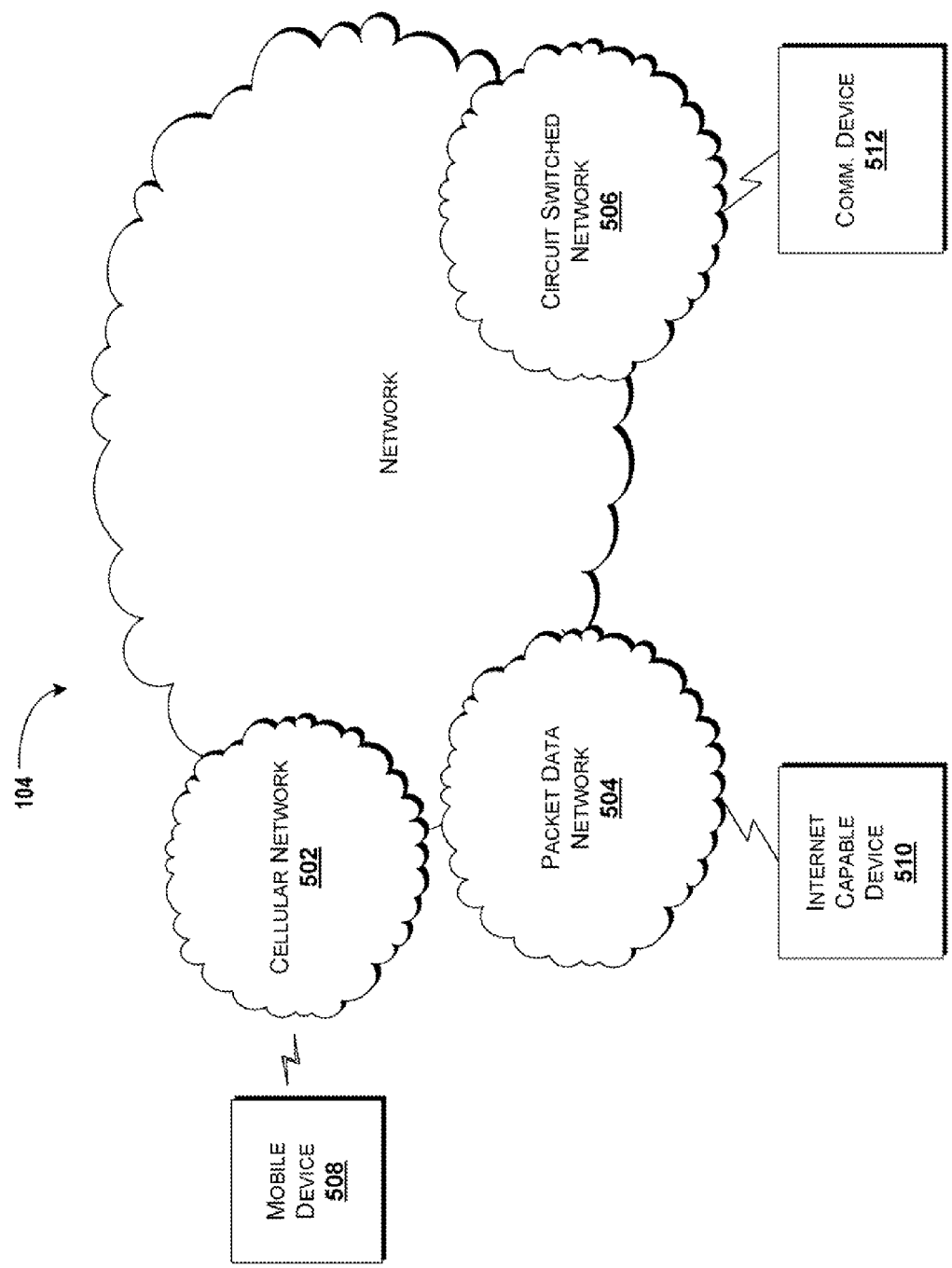
FIG. 5 schematically illustrates a network, according to an exemplary embodiment of the present disclosure.

Turning now to FIG. 5, an exemplary network 104 is illustrated, according to an exemplary embodiment of the present disclosure. The network 104 includes a cellular network 502, a packet data network 504, for example, the Internet (Internet), and a circuit switched network 506, for example, a publicly switched telephone network (PSTN). The cellular network 502 includes various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, an Internet protocol multimedia subsystem (IMS), and the like. The cellular network 502 also includes radios and nodes for receiving and transmitting voice, data, and combinations thereof to and from radio transceivers, networks, the Internet 504, and the PSTN 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM (Global System for Mobile communications) network, and can provide data communications via GPRS (General Packet Radio Service) and EDGE (Enhanced Data rates for GSM Evolution). Additionally, the cellular network 502 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 502 also is compatible with 4G mobile communications standards.

The Internet 504 includes various devices, for example, servers, computers, databases, and other devices in communication with another, as is generally known. The Internet 504 devices are accessible via one or more network links. The servers often store various files that are provided to a requesting device such as, for example, a computer, a terminal, a smart phone, or the like. Typically, the requesting device includes software (a "browser") for executing a web page in a format readable by the browser or other software. Other files and/or data may be accessible via "links" in the retrieved files, as is generally known. The PSTN 506 includes various hardware and software for providing circuit switched communications. The PSTN 506 may include, or may be, what is often referred to as a plain old telephone system (POTS). The functionality of a PSTN 506 or other circuit-switched network are generally known and will not be described herein in detail.

The illustrated cellular network 502 is shown in communication with the Internet 504 and a PSTN 506, though it should be appreciated that this is not necessarily the case. One or more Internet-capable devices 510, for example, a PC, a laptop, a portable device, the device 508, a smart phone, or any other suitable device, can communicate with one or more cellular networks 502, and devices 508 connected thereto, through the Internet 504. It also should be appreciated that the Internet-capable device 510 can communicate with the Internet 504 through the PSTN 506, the cellular network 502, and/or via other networks (not illustrated). As illustrated, a communications device 512, for example, a telephone, facsimile machine, modem, computer, or the like, can be in communication with the PSTN 506, and therethrough to the Internet 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the Internet 504, and/or the PSTN 506, alone or in combination with other networks, network elements, and the like.

Figure 6:
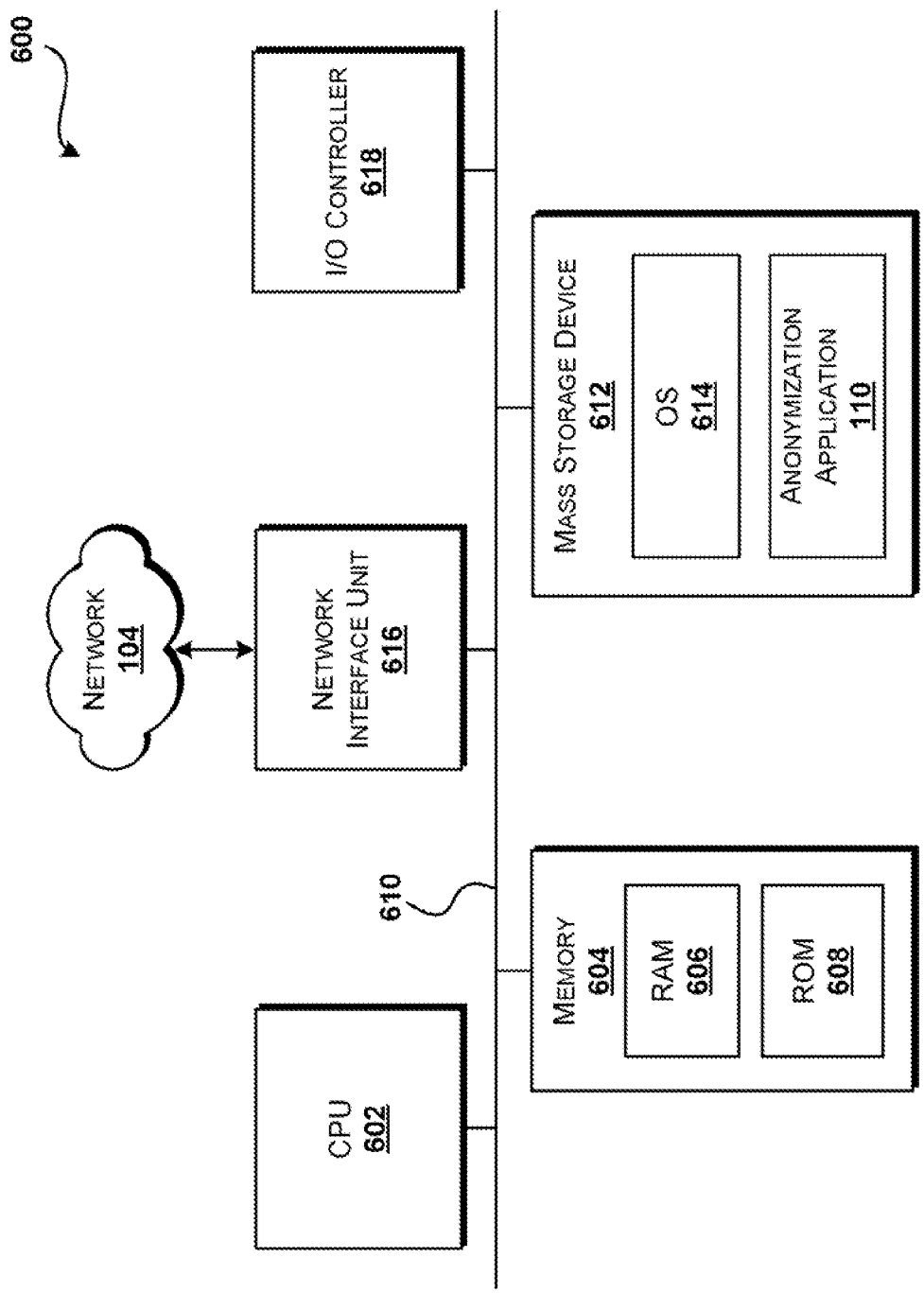
FIG. 6 is a computer architecture diagram illustrating an exemplary computer hardware and software architecture for a computing system capable of implementing aspects of the embodiments presented herein.

FIG. 6 illustrates an exemplary computer architecture 600 for a device capable of executing the software components described herein for generating data or data sets 108 that are resistant to minimality attacks. Thus, the computer architecture 600 illustrated in FIG. 6 illustrates an architecture for a server computer, mobile phone, a PDA, a smart phone, a server computer, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 614 and the anonymization application 110. The mass storage device 612 also can be configured to store the data sets 108.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media that can be accessed by the computer architecture 600.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of this specification and the claims, the phrase "computer-readable storage medium" and variations thereof, does not include waves, signals, and/or other transitory and/or intangible communication media.

According to various embodiments, the computer architecture 600 may operate in a networked environment using logical connections to remote computers through a network such as the network 104. The computer architecture 600 may connect to the network 104 through a network interface unit 616 connected to the bus 610. It should be appreciated that the network interface unit 616 also may be utilized to connect to other types of networks and remote computer systems, for example, the data storage device 102. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art.

It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for generating data and data sets that are resistant to minimality attacks have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
   receiving, at a computer executing an anonymization application, a data set at an anonymization engine, the data set comprising a plurality of tuples;
   ordering, by the computer, the tuples in the data set according to an aspect of the tuples;
   partitioning, by the computer, the tuples into a plurality of buckets, each of the plurality of buckets comprising a predefined number of the tuples;
   selecting, by the computer, a bucket of the plurality of buckets as a group;
   determining, by the computer, if the group satisfies a privacy requirement; and
   if a determination is made that the group does not satisfy the privacy requirement,
      determining if a further bucket of the plurality of buckets is available,
      merging the further bucket into the group to form a further group,
      determining if the further group satisfies the privacy requirement, and
      if a determination is made that the further group satisfies the privacy requirement, outputting a new data set comprising the group and the further group.

2. The method of claim 1, wherein the privacy requirement comprises l-diversity, and the predefined number of tuples comprises l.

3. The method of claim 1, further comprising:
   determining if first additional buckets of the plurality of buckets are available; and
   outputting the data set, if a determination is made that the first additional buckets are not available.

4. The method of claim 3 further comprising:
   merging a further bucket of the additional buckets into the group to obtain a new group, if a determination is made that the additional buckets of the plurality of buckets are available;
   determining if the new group satisfies the privacy requirement;
   determining if second additional buckets are available, if a determination is made that the new group satisfies the privacy requirement; and
   outputting a further new data set comprising the new group, if a determination is made that the second additional buckets are not available.

5. The method of claim 4, further comprising:
   identifying a noncompliant group that does not satisfy the privacy requirement; and
   removing the noncompliant group before outputting the new data set.

6. The method of claim 1, further comprising:
   determining if additional buckets of the plurality buckets are available, if a determination is made that the group satisfies the privacy requirement;
   selecting a new group, if a determination is made that the additional buckets are available;
   determining if the new group satisfies the privacy requirement; and
   taking a further action based upon the determining.

7. The method of claim 1, further comprising:
   splitting the data set into a plurality of data set groups;
   determining if a selected data set group of the plurality of data set groups satisfies the privacy requirement; and
   taking a further action based upon the determining.

8. The method of claim 7, further comprising merging the plurality of data set groups together to obtain the data set and outputting the data set, if a determination is made that the selected data set group does not satisfy the privacy requirement.

9. The method of claim 7, further comprising:
   selecting a data set group of the plurality of data set groups;
   determining if the data set group of the plurality of data set groups satisfies the privacy requirement; and
   splitting the data set group of the plurality of data set groups, if a determination is made that the group of the plurality of groups does satisfy the privacy requirement.

10. The method of claim 1, wherein:
    the tuples comprise sensitive data and non-sensitive data, the sensitive data comprising quasi-identifiers and sensitive attributes;
    the aspect of the tuples comprises the non-sensitive data; and
    the new data set further comprises the quasi-identifiers and the sensitive attributes.

11. The method of claim 1, wherein the data set comprises data collected from a telecommunications network.

12. A system comprising:
    a processor; and
    a memory that stores computer-executable instructions that, when executed by the processor, cause the processor to perform operations comprising
    receiving a data set comprising a plurality of tuples, each of the tuples comprising sensitive data and non-sensitive data;
    order the tuples in the data set according to the non-sensitive data;
    partitioning, by the computer, the tuples into a plurality of buckets, each of the plurality of buckets comprising a predefined number of the tuples;
    selecting a bucket of the plurality of buckets as a group;
    determining if the group satisfies a privacy requirement; and
    if a determination is made that the group does not satisfy the privacy requirement,
       determining if a further bucket of the plurality of buckets is available,
       merging the further bucket into the group to form a further group, determining if the further group satisfies the privacy requirement, and if a determination is made that the further group satisfies the privacy requirement, outputting a new data set comprising the group and the further group.

13. The system of claim 12, wherein the computer-executable instructions, when executed by the processor, cause the processor to perform operations further comprising:

splitting the data set into a plurality of data set groups;

determining if a selected data set group satisfies the privacy requirement; and taking an action based upon the determining.

14. A computer-readable storage medium comprising computer-executable instructions that, when executed by a processor, cause the processor to perform operations comprising:

receiving a data set comprising a plurality of tuples, each of the tuples comprising sensitive data and non-sensitive data;

order the tuples in the data set according to the non-sensitive data;

partitioning, by the computer, the tuples into a plurality of buckets, each of the plurality of buckets comprising a predefined number of the tuples;

selecting a bucket of the plurality of buckets as a group;

determining if the group satisfies a privacy requirement; and if a determination is made that the group does not satisfy the privacy requirement determining if a further bucket of the plurality of buckets is available, merging the further bucket into the group to form a further group, determining if the further group satisfies the privacy requirement, and if a determination is made that the further group satisfies the privacy requirement, outputting a new data set comprising the group and the further group.

15. The computer-readable storage medium of claim 14, further comprising instructions that, when executed by the processor, cause the processor to perform operations further comprising:

if a determination is made that the group satisfies the privacy requirement:

determining if an additional bucket of the plurality of buckets is available;

outputting the new data set comprising the group, if a determination is made that the additional bucket is not available;

merging the additional bucket into the group, if a determination is made that the additional bucket is available; and if a determination is made that the group does not satisfy the privacy requirement, outputting the data set.

16. The computer-readable storage medium of claim 14, further comprising instructions that, when executed by the processor, cause the processor to perform operations further comprising:

splitting the data set into a first plurality of data set groups;

selecting a data set group of the first plurality of data set groups;

determining the data set group of the first plurality of data set groups satisfies the privacy requirement;

if a determination is made that the data set group of the first plurality of data set groups does not satisfy the privacy requirement, merging the first plurality of data set groups together to obtain the data set and outputting the data set;

if a determination is made that the data set group of the first plurality of data set groups does satisfy the privacy requirement, recursively splitting the data set group of the first plurality of data set groups into a second plurality of data set groups, and determining if the second plurality of data set groups satisfies the privacy requirement.

\* \* \* \* \*